Aug. 16, 1966 R. T. HALL 3,266,296
METHOD AND APPARATUS FOR INSPECTING ANNULAR WORKPIECES
Filed Aug. 28, 1963 6 Sheets-Sheet 1

INVENTOR.
Robert T. Hall
BY
Karness, Dickey & Pierce
ATTORNEYS.

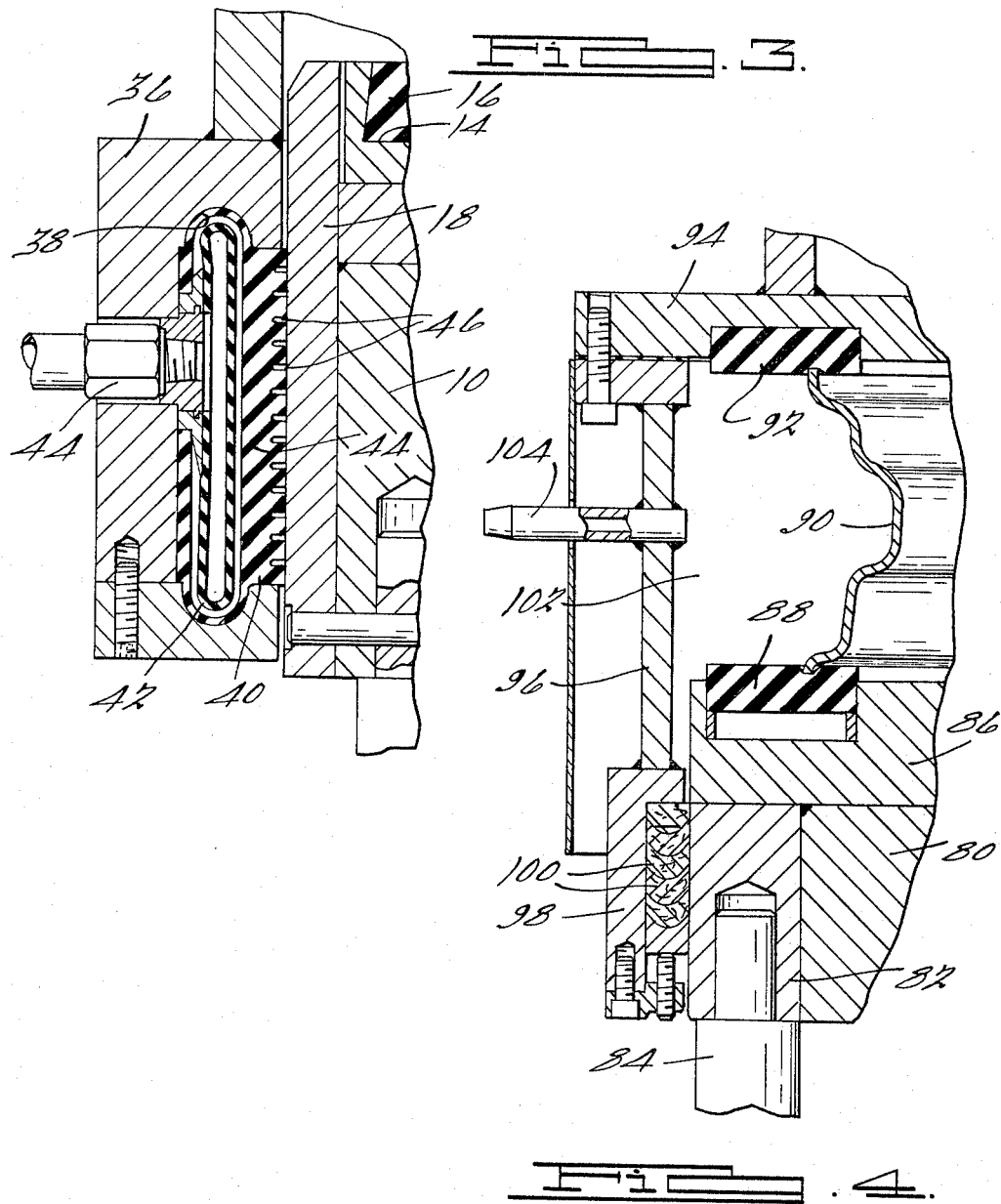

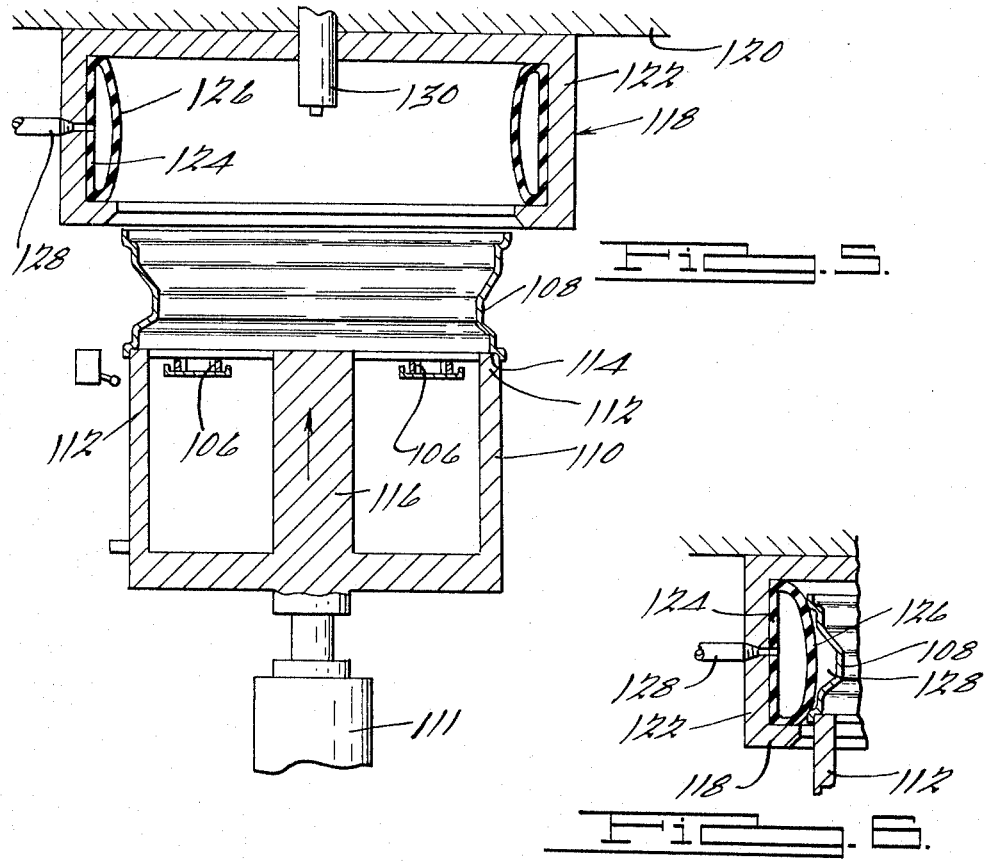
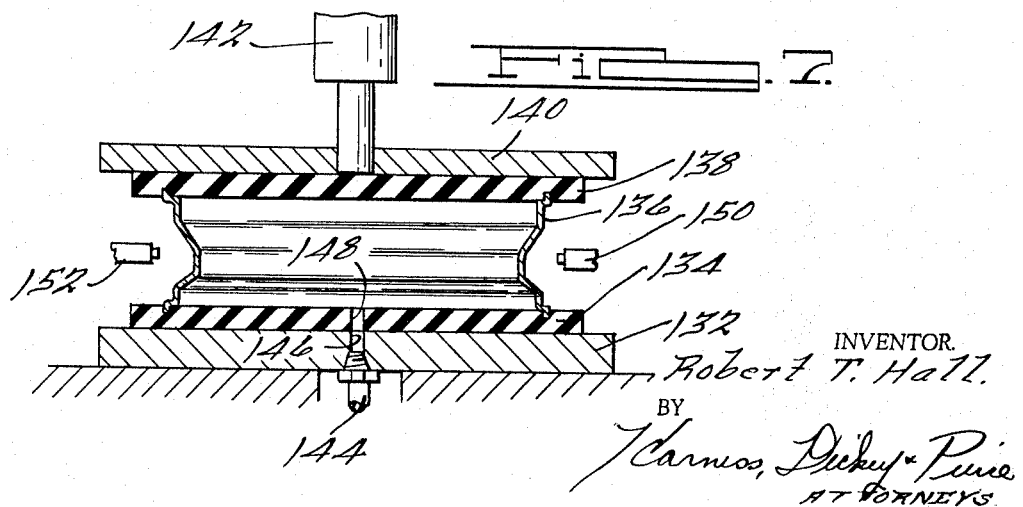

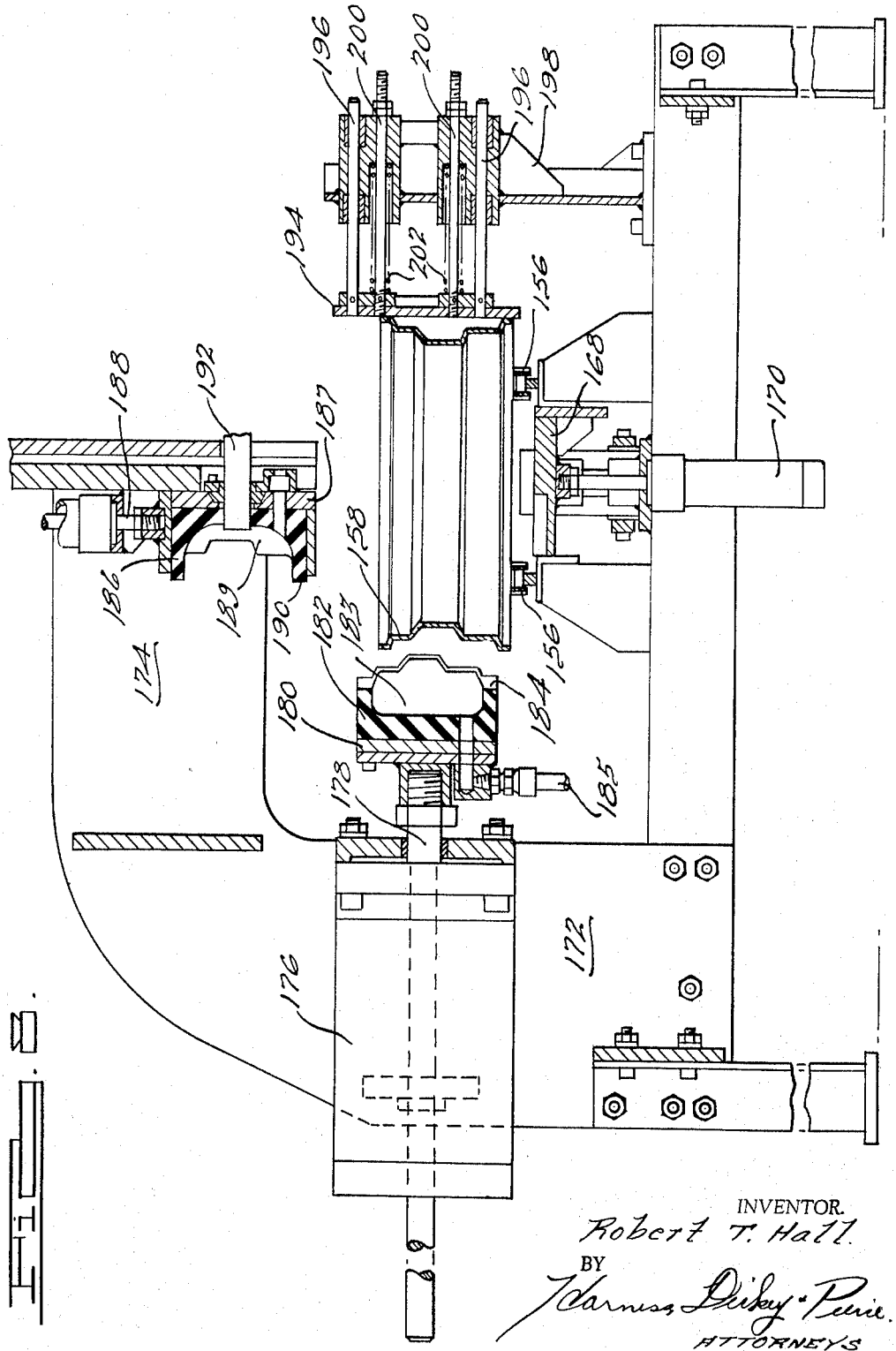

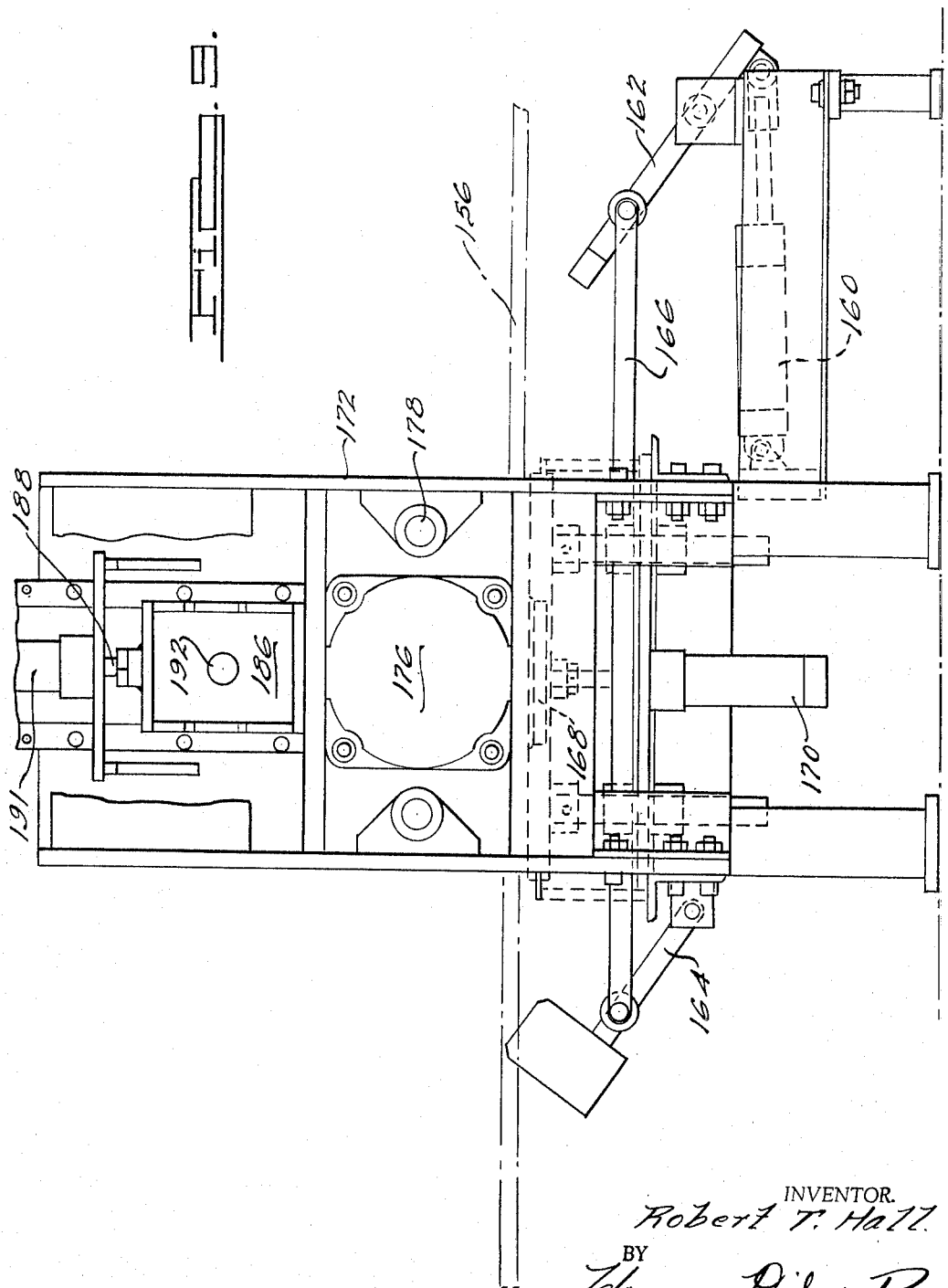

Aug. 16, 1966 R. T. HALL 3,266,296
METHOD AND APPARATUS FOR INSPECTING ANNULAR WORKPIECES
Filed Aug. 28, 1963 6 Sheets-Sheet 6
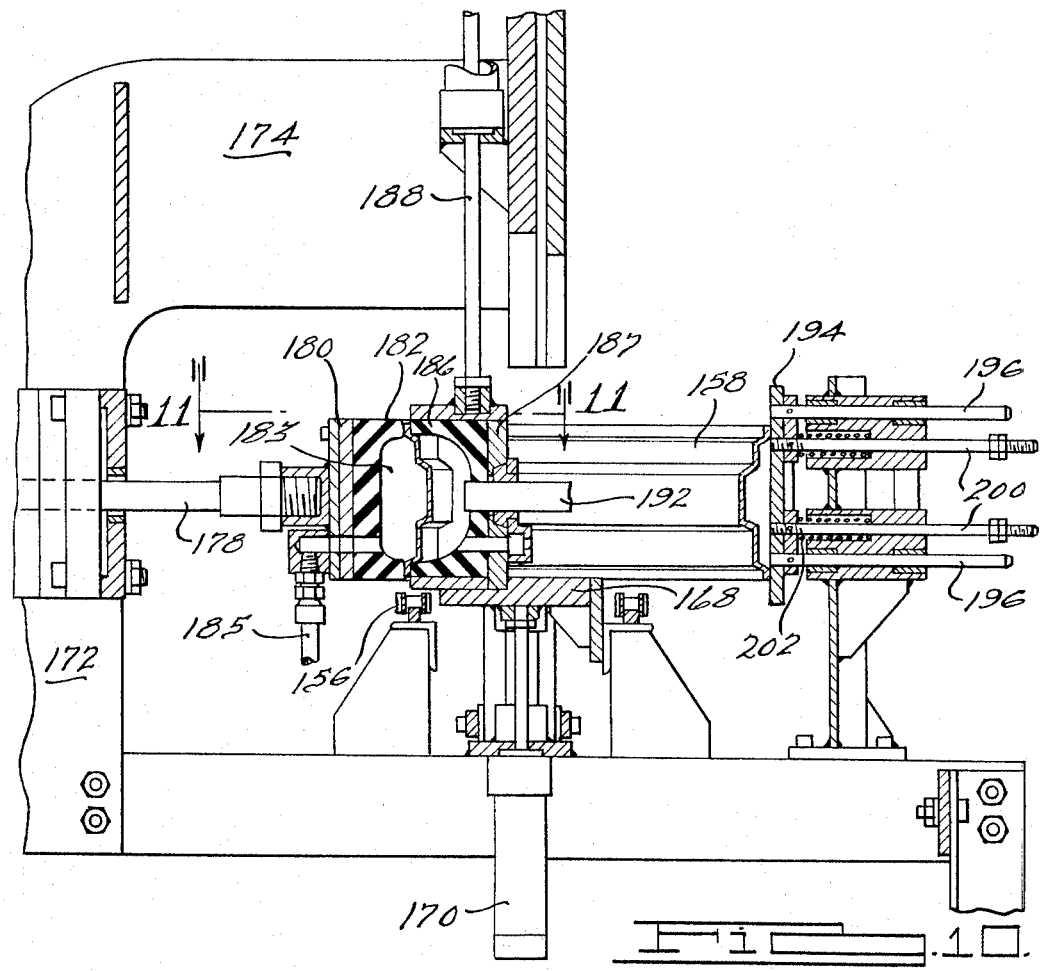
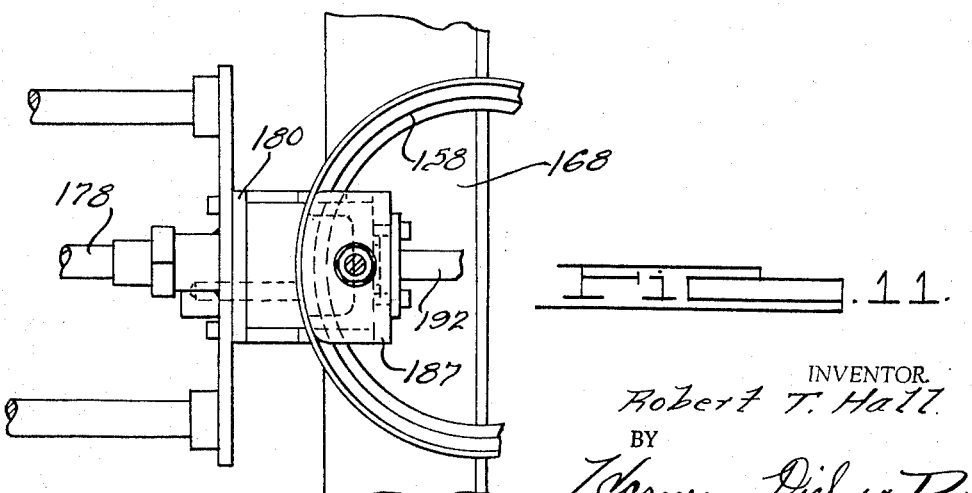
INVENTOR.
Robert T. Hall
BY
Carness, Dickey & Pierce
ATTORNEYS

United States Patent Office 3,266,296
Patented August 16, 1966

3,266,296
METHOD AND APPARATUS FOR INSPECTING ANNULAR WORKPIECES
Robert T. Hall, Orchard Lake, Mich., assignor to Kelsey-Hayes Company, Romulus, Mich., a corporation of Delaware
Filed Aug. 28, 1963, Ser. No. 305,131
6 Claims. (Cl. 73—40)

This invention relates to a method and apparatus for inspecting annular workpieces to determine the presence of leaks therein and particularly to such a method and apparatus for inspecting wheel rims.

In the manufacture of wheel rims, a strip of sheet metal is cut to a predetermined length and thereafter rolled into hoop shape. The opposite ends of the hoop are butt welded together to form a continuous workpiece which is subsequently rolled or die formed to produce a rim of the desired cross-sectional contour. Frequently an imperfection will occur in the weld line producing a hole through which inflationary air can escape when a tubeless tire is mounted on the rim. For this reason it is extremely important that any such leaks be detected and repaired. On the other hand unnecessary expense will be incurred in repairing every minor flaw which is suspected of containing a leak after a visual inspection of the rim. Leaks of the size which must be detected are as small as one-thousandth or two-thousandths of an inch in diameter and such small holes are not readily visually ascertainable. The apparatus and method of the present invention provides a means for reliably checking a rim to determine the presence of such small leaks therein. This apparatus involves the use of ultrasonic detecting equipment and is based on the phenomenon that air under pressure escaping through a minute opening or orifice will produce a high frequency vibration, this vibration may be detected even though it is above the range of frequencies audible to the human ear. Such vibrations are in the range of twenty thousand to forty thousand cycles per second and the electronic equipment which is used is capable of translating them into human perceptible signals.

Accordingly, it is an object of the present invention to provide a method and apparatus for detecting air leaks in wheel rims and similar workpieces in a rapid, reliable and highly convenient manner.

It is another object of the present invention to provide a method and apparatus for detecting air leaks in wheel rims which are incapable of being detected visually.

It is still another object of the present invention to provide apparatus of the above character which is low in initial cost, easy to maintain, and is compatible with high production techniques.

These and other objects of the present invention will become apparent from the following detailed description, taken together with the accompanying drawings, wherein:

FIG. 3 is an enlarged view of the structure within the circle 3 of FIGURE 1.

FIG. 4 is an enlarged fragmentary view of structure similarly illustrated in FIGURE 1, showing a somewhat modified construction.

FIG. 5 is a vertical sectional view of apparatus illustrating another form of the present invention.

FIG. 6 is a fragmentary view of the structure of FIGURE 5, with the parts being moved to another position.

FIG. 7 is a vertical sectional view of apparatus illustrating still another form of the present invention.

FIG. 8 is a transverse sectional view of apparatus illustrating still another form of the present invention;

FIG. 9 is a side elevational view of the structure shown in FIGURE 9, the conveyor being shown in broken lines;

FIG. 10 is a view of a portion of the structure illustrated in FIGURE 8 with the several parts being shown in appropriate position for detecting a leak in the rim; and FIG. 11 is a sectional view of the structure illustrated in FIG. 10 taken along the line 11—11 thereof.

Figures 1, 2:
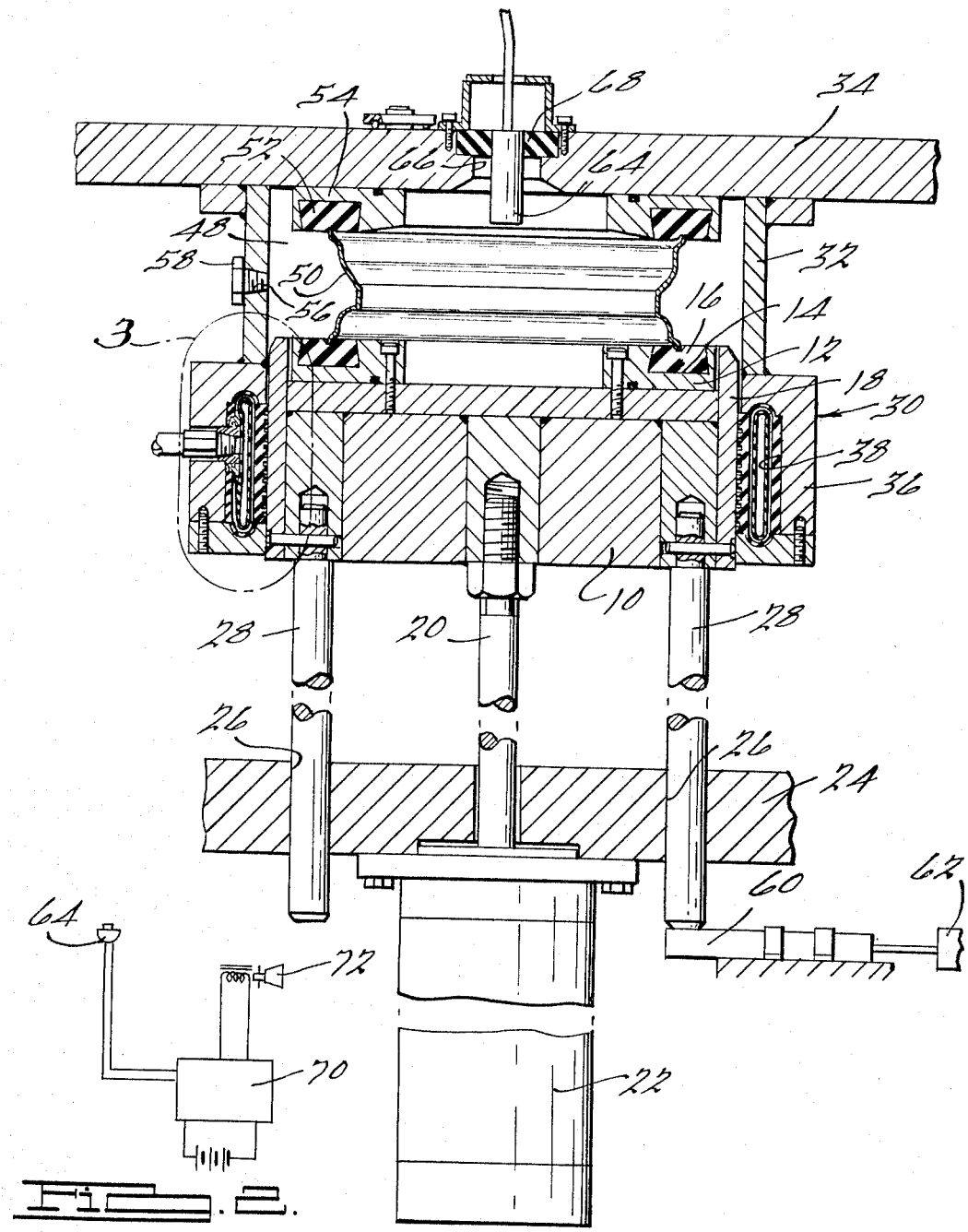
FIGURE 1 is a vertical sectional view with parts broken away of apparatus constructed in accordance with the present invention.
FIG. 2 is a diagrammatic view of the electronic equipment forming a part of the apparatus of the present invention.

facing groove 14 supporting an annular rubber seal 16.

Referring now to FIGURE 1, the apparatus illustrated therein will be seen to include a table 10 carrying an annular plate 12 at its upper surface which has an upwardly facing groove 14 supporting an annular rubber seal 16. The table 12 carries a cylindrical casing 18 extending circumferentially therearound and having a circular cylindrical outer surface. Table 10 is movable in a vertical direction by a piston rod 20 actuated by a hydraulic cylinder 22. The cylinder 22 is secured to a base member 24 which is also provided with guide openings 26 receiving guide rods 28 fixedly depending from the table 10. The guide rods serve to guide and align the vertical travel of the table 10.

The table 10 is adapted to be raised from a lowered position to a raised position disposed within an air chamber housing 30. The housing 30 includes a cylindrical side wall 32 hung from the underside of a supporting plate 34. When the table 10 is in its raised position (as illustrated in FIGURE 1) the casing 18 thereof is in confronting relation to a seal retainer 36 forming a part of the housing 30. The seal retainer 36 has an inwardly facing annular groove or cavity 38 which encloses an inflatable rubber seal 40. The seal 40 has an inner tube 42 having an air fitting 44 which is adapted to be connected to any convenient source of air pressure such as a compressor or compressor tank (not shown). The standard compressed air source which is available in most factories may be utilized. The seal 40 will be seen to have a thickened wall portion 44 adjacent the inner diameter thereof provided with a grooved face 46 engageable with the table casing 18. After the table 10 is raised to the position illustrated in FIGURE 1, the inner tube 42 is inflated to expand the seal 40 and force the surface 46 thereof against the casing 18 to seal the annular clearance space between the casing 18 and the member 36. This results in the sealing of an annular air chamber 48 defined at its bottom by the table 10, at its outer periphery by the wall 32, and at its top by the supporting plate 34. The inner periphery of the air chamber is defined by the wheel rim to be inspected, which is illustrated at 50. The rim 50 is positioned on its side with its lower edge resting on the seal 16. When the table is raised, the upper edge of the rim will engage a downwardly facing rubber seal 52 carried in a retainer 54 welded to the under surface of the supporting plate 34. Thus, the rim 52 divides the interior of the housing 30 into radially inner and radially outer parts, so that any air passing between said parts can only do so through a leak in the rim 50. The outer part, which is the chamber 48, is pressurized through an inlet orifice 56 having a fitting 58 which is connected to any suitable source of compressed air. The space enclosed by the rim remains at atmospheric pressure and, therefore, the air in the chamber 48 will seek to enter this space if any openings are present in the rim 50.

When the chamber 48 is pressurized, a force will be developed which acts against the table 10 and opposes the force of the cylinder 22 which maintains the seals 16 and 52 tightly against the rim. To avoid possible downward movement of the table 10 from this cause, locking members 60 are moved into engagement with the guide rods 28. While a locking member 60 is shown with only one of the guide rods 28, the device is preferably supplied with a locking member 60 for each guide rod 28. The locking members may be moved into and out of engagement with the guide rods 28 by a pneumatic cylinder 62.

As previously mentioned, leakage of air through a small hole in the rim 50 will generate an ultrasonic vibration. This high frequency vibration is detected by a probe or a microphone 64 which passes through an opening 66 in the supporting plate 34 and is held in place within the rim by a rubber mounting pad 68. As illustrated in FIGURE 2, the microphone 64 is connected to an amplifier 70, the output of which may be fed to a loud-speaker 72. A combined amplifier and loud-speaker for translating the high-frequency vibrations created by such small leaks into human audible sound is produced by the Delcon Corporation of Palo Alto, California. A portable model of such a unit is known as the model 114. Electronic ultrasonic detecting devices are well known and it is not believed that any detailed description of same is necessary, nor is the present invention limited to use with any particular ultrasonic detecting device. It will be apparent to those conversant in this art that the output of such a translator may be variously used. For example, an oscilloscope may be substituted for the loud-speaker for visual observations of the frequencies being detected. Similarly, the output of such a translator may be utilized to actuate a switch for controlling automatic equipment to segregate leaky rims.

It will be noted that because of the central location of the microphone 64 within the rim, no precautions must be made to establish the angular position of the weld line of the rim. Wherever the weld line is positioned around the seals 52 and 16, any leakage therethrough will be picked up by the microphone 64. It will also be noted that after a rim has been inspected, the apparatus is unloaded by first retracting the locking member 60 and deflating the seal 40. The table 10 may then be lowered and the rim 50 removed and replaced by another rim to be inspected.

FIGURE 4 illustrates a somewhat modified construction in which a table 80 has a ring-shaped upper portion 82 to which the guide rods 84 are connected. The table 80 carries a plate 86 supporting a rubber seal 88 on which a rim 90 to be inspected is positioned. When the table is raised, the upper edge of the rim will engage a rubber seal 92 facing downwardly from a supporting plate 94. An annular casing 96 is suspended from the support plate 94 in sealed relation therewith and carries a ring-shaped seal housing 98 at its lower end provided with a plurality of chevron seals 100 engageable with the outer peripheral surface of the ring member 82 when the table is elevated to the position shown in FIGURE 4. Thus, when a chamber 102 surrounding the rim 90 is inflated through an air nozzle 104, the chevron seals 140 will prevent air leakage out of said chamber through the clearance space between the casing 96 and the ring member 82 of the table 80.

Still another form of the invention is illustrated in FIGURES 5 and 6 in which a pair of conveyor belts 106 are utilized for supporting and moving a line of rims to be inspected, one of said rims being illustrated at 108. The conveyor belts 106 move in a direction perpendicular to the plane of the sheet. A rim to be inspected is moved to a position in vertical alignment with a fixture 100 which is moved vertically by an hydraulic cylinder 112. The fixture 110 has arms 112 which engage an annular shoulder 114 of the rim on diametrically opposite sides thereof and in locations outwardly of the conveyor belt 106. Additionally, a central upwardly extending platform 116 of the fixture 110 engages the shoulder 114 at locations spaced 90° between the points at which the arms 112 contact it. Thus, the rim 108 is stabilized against tipping and is supported for upward movement into a downwardly open air chamber housing 118. The housing 118 is suspended from a supporting member 120 and includes a cylindrical enclosing side wall 122 which is adapted to surround the rim when the rim is in an elevated position. Secured to the inner peripheral surface of the wall 122 is an annular rubber tube 124. The inner surface of the tube 124 functions as a diaphragm 126 so that as the tube is inflated through a nozzle 128, the diaphragm portion 126 will seal against the edges of the rim on axially opposite sides thereof and pressurize an annular space 128 bounded by the outer peripheral surface of the rim and the diaphragm surface 126. By this means, air in the pressurized space 128 will be driven through any leak in the weld line of the rim 108. This leakage will be detected by a probe or microphone 130 projecting centrally into the housing 118 from the upper surface thereof.

FIGURE 7 illustrates still another embodiment of the present invention in which a stationary bed plate 132 has a large circular rubber disc or seal 134 bonded to its upper surface. A rim 136 to be inspected is laid on its side on the seal 134 for engagement of one edge thereof by a seal 138 secured to the under surface of a movable plate 140. The upper plate 140 is raised and lowered by a power cylinder 142. Thus, when the seal 138 is brought into tight fitting engagement with the upper edge of the rim 136, the space bounded by the rim 136 and the seals 134 and 138 will be enclosed. This space is pressurized by compressed air from a conduit 144 which is in communication with the interior of the rim through a passage 146 formed in the bed plate 132 and a passage 148 formed in the seal 134. Leakage of the air through a leak in the rim will thus be to the outside in this embodiment of the invention, and this leakage may be detected by a microphone 150 or 152. If only one microphone is used, the weld line of the rim must be oriented with regard to the location of the microphone. Furthermore, the structure of this embodiment is preferably surrounded with insulating material to prevent the pickup of random factory noises or vibrations.

The embodiment of the invention illustrated in FIGS. 8 to 11 discloses means for forming sealed chambers on opposite sides of the rim in a limited area of the rim including the weld line. Accordingly, the apparatus in this invention is particularly designed for checking leaks in the weld line and is not suitable for checking leaks formed in the rivet holes by which the central body, a spider of a wheel, is frequently connected to the rim.

As illustrated in FIG. 8, the apparatus is shown for use in checking rims being moved along a double chain conveyor 156. A rim 158 is shown on the conveyor in a position to be checked for leaks. The rim is also angularly oriented to position the weld line on one side of the conveyor in a position where it will be enclosed by the aforementioned chamber defining means. The chain 156 is run continuously. However, when a rim is in a given position adjacent the apparatus, an air cylinder 160 (FIG. 9) is actuated to operate a pair of stop members 162 and 164 which are interconnected by a lever 156 for joint operation. The member 164 holds the rim to be checked while the member 162 prevents the following rims from moving into the leak checking station. When the stop members 162 and 164 are raised, the chain slides freely under the rims. The stop member 164 holds the rim 158 to be checked in a position centered over an elevator 168 which is raised and lowered by an air cylinder 170. A frame member 172 is positioned to one side of the elevator and has an overhead portion 174 suspended above the elevator 168. A horizontally and transversely operating air cylinder 176 is mounted on the frame 172 and carries at the end of its actuation rod 178 a mounting plate 180 to which is secured rubber enclosure member 182 having a chamber 183 facing the rim 158. The periphery of the chamber 183 is defined by a lip or surface 184 contoured to the shape of the rim and adapted to sealingly engage the outer diameter of the rim. The rim 158 and the housing 182 cooperate to define a sealed enclosure which is pressurized by compressed air admitted to this enclosure from an air supply conduit 184.

Suspended above the rim 158 on the upper frame portion 174 is a rubber enclosure member 186. The member 186 is mounted on a plate 187 which is connected to the piston rod 188 of an air cylinder 191 by which it may be raised and lowered. The enclosure member 186 is formed with a chamber 189 which is bounded by a lip 190 adapted to conformingly engage the inner diameter of the rim to be checked. Thus, the member 186, the seal 190 and the inner surface of the rim 158 cooperate to define a second chamber disposed in the area of the rim weld line.

The apparatus of FIGS. 8 to 10 is designed to operate so that when a rim 158 to be checked is in position within the work station it is immediately elevated by operation of the elevator 168; thereafter, the housing 186 is moved downwardly within the interior of the rim in a position adapted to be contacted by the inner surface of the rim. Thereafter, the air cylinder 176 is actuated to move the housing 180 inwardly, when the seal 182 contacts the outer surface of the rim it will slide the rim across the elevator until the inner surface of the rim contacts the seal 190. In such position the cylinder 176 serves to supply the necessary force to maintain both the seals 182 and 190 in sealing contact with the outer and inner surface of the rim respectively. Compressed air is then admitted to the chamber defined on the outside of the rim through the air conduit 184. Should any leaks be present in the weld line which is exposed to this chamber air will pass through such leaks to produce high frequency vibration which are sensed by a microphone 192 carried by the housing 186 and open to the interior thereof. After the rim 158 has been checked, the air cylinder 176 is exhausted to retract the housing 182. When this is done, the rim 158 will be recentered on the elevator 168 by means of a centering plate 194 which is secured to the end of guide rods 196 passing through suitably formed bearings in a support stand 198. Elongated bolts 200 are also connected to the plate 194 and return springs 202 are positioned around such bolts so as to move the centering plate 194 to the left and recenter to the left (as shown in FIG. 8) as the housing 180 is retracted after the rim has been checked. It will of course be appreciated that as the housing 180 is advanced to move the rim to the right into contact with the seal 190, preparatory to checking the rim, the spring 202 will collapse to permit this movement. After the rim 158 has been recentered, the housing 186 is raised and the elevator 168 has been recentered, the housing 186 is raised and the elevator 168 is lowered; thereafter the air cylinder 160 is then exhausted to permit the escapement levers 164 and 162 to retract thus permitting the rim 158 which has been checked to advance out of the leak checking station by the chain conveyor and to permit a new rim to be checked to be moved into a position above the elevator 168.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. Apparatus for inspecting wheel rims or the like to determine the presence of leaks therein including a table having an upwardly facing resilient seal engageable with one edge of a rim supported thereon, means for vertically moving said table, a cylindrical surface on said table extending in the direction of movement of the table, a stationary housing into which the rim is movable upon the elevation of said table, a downwardly facing resilient seal associated with said housing and engageable with the edge of the rim opposite from that engaged by the seal of said table, and a seal carried by said housing engageable with said cylindrical surface to seal and enclose an air chamber bounded by said housing, said first two mentioned seals and the radially outer surface of the rim, means for pressurizing said air chamber and means disposed generally within the space enclosed by the rim for sensing ultrasonic vibrations produced by air passing through leaks in the rim.

2. The structure set forth in claim 1 in which the said seal engageable with said cylindrical surface is inflatable to bear against said cylindrical surface with a force produced by inflationary pressure.

3. Apparatus for inspecting wheel rims or the like to determine the presence of leaks therein including an annular diaphragm engageable with a rim to be inspected adjacent the axially opposite edges thereof, said diaphragm being operable to enclose a space surrounding the radially outer surface of the rim, means for pressurizing said diaphragm to move it radially inwardly of said rim and pressurize the enclosed space around said rim and means disposed generally within the area bounded by said rim for detecting ultrasonic vibrations produced by air passing through leaks in the rim upon pressurization of the space surrounding the rim.

4. Apparatus for inspecting wheel rims or the like to determine the presence of a leak in a localized area thereof including a first member sealingly engageable with the surface of a rim to be checked and operable to form a chamber bounded in part by said rim, means for pressurizing said chamber for relatively moving said first member into and out of contact with said rim in a direction perpendicular to the axis of said rim, a second member movable parallel to the axis of said rim and engageable with said rim on the opposite side of said surface, said second member being operable to sealingly engage said rim and to define a chamber bounded in part by said rim and sensing means carried by said second member within the chamber thereof for sensing vibrations produced by the pressurized fluid passing through a leak in the rim.

5. Apparatus for inspecting wheel rims or the like including a conveyor for transporting a plurality of rims to be checked, an elevator for individually raising each rim to be checked upwardly from said conveyor, a first member moveable horizontally and transversely with respect to said conveyor into and out of engagement with a rim on said elevator, said first member being sealingly engageable with the outer surface of a rim supported by said elevator and defining a chamber bounded in part by said rim, a second member movable vertically into the interior of said rim, said second member having a chamber defining portion bounded by a lip engageable with a rim to be checked on an inner surface thereof opposite said first member, said first member being operable to move the rim to be checked into contact with said second member by its engagement therewith and sensing means carried by said second member within the chamber defining portion thereof for detecting ultrasonic vibrations produced by pressurized fluid passing through the rim to be checked.

6. The structure set forth in claim 5 including a spring biased return mechanism for returning a rim to be checked to its original position on said elevator upon movement of said first member in a direction tending to produce disengagement thereof with a rim on said elevator.

(References on following page)

References Cited by the Examiner

UNITED STATES PATENTS

| | | | |
|---|---|---|---|
| 2,295,852 | 9/1942 | Lejeune | 29—159.1 X |
| 2,433,043 | 12/1947 | Gray | 73—45.2 |
| 2,445,876 | 7/1948 | Fullerton | 73—49.5 |
| 2,447,333 | 8/1948 | Hayes. | |
| 2,645,117 | 7/1953 | Bendix | 73—49.1 |
| 2,703,978 | 3/1955 | Baxter | 73—40.7 |
| 2,880,610 | 4/1959 | McCoy | 73—49.2 |
| 2,977,798 | 4/1961 | Lindberg | 73—40 |
| 3,028,450 | 4/1962 | Manning | 73—40.5 |

FOREIGN PATENTS 910,394  6/1946  France.

LEONARD FORMAN, *Primary Examiner.*

ISAAC LISANN, J. D. BOOS, *Assistant Examiners.*